(12) United States Patent
Jeon et al.

(10) Patent No.: US 8,986,844 B2
(45) Date of Patent: Mar. 24, 2015

(54) TOUCH SCREEN PANEL AND METHOD FOR MANUFACTURING THEREOF

(75) Inventors: Byeong-Kyu Jeon, Yongin (KR); Sung-Ku Kang, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 774 days.

(21) Appl. No.: 12/929,153

(22) Filed: Jan. 4, 2011

(65) Prior Publication Data

US 2011/0267288 A1 Nov. 3, 2011

(30) Foreign Application Priority Data

Apr. 28, 2010 (KR) .......... 10-2010-0039542

(51) Int. Cl.
*B32B 27/00* (2006.01)
*C03C 15/00* (2006.01)
*G06F 3/041* (2006.01)
*G06F 3/044* (2006.01)

(52) U.S. Cl.
CPC .............. *G06F 3/044* (2013.01); *G06F 3/0412* (2013.01)
USPC ............ 428/425.6; 428/426; 216/83; 216/87; 216/96

(58) Field of Classification Search
CPC ....... G06F 3/041; G06F 3/0412; G06F 3/044; G06F 3/045
USPC .............. 216/83, 87, 96; 345/173; 428/425.6, 428/426, 1.32, 1.62
See application file for complete search history.

(56) References Cited

U.S. PATENT DOCUMENTS

| 2002/0041946 A1* | 4/2002 | Abe ........................... 428/64.2 |
| 2010/0182274 A1* | 7/2010 | Kang et al. .................... 345/174 |
| 2011/0037721 A1* | 2/2011 | Cranfill et al. ................ 345/174 |

FOREIGN PATENT DOCUMENTS

| KR | 10 2005-0011296 A | 1/2005 |
| KR | 10-0894310 B1 | 4/2009 |
| KR | 10 2010-0006987 A | 1/2010 |
| KR | 10 2010-0019480 A | 2/2010 |
| KR | 10-2010-0084257 A | 7/2010 |
| WO | WO 2010101961 A2 * | 9/2010 |

* cited by examiner

Primary Examiner — Binh X Tran
(74) Attorney, Agent, or Firm — Lee & Morse, P.C.

(57) ABSTRACT

A method for manufacturing a touch screen panel includes reinforcing a glass substrate, the glass substrate to be formed with a plurality of touch screen panels in unit cells, reinforcing the glass substrate including forming a reinforcing layer on an upper and a lower side of the glass substrate by performing a reinforcement treatment on a whole surface of the glass substrate, cutting the reinforced glass substrate in each unit cell, removing a part of the reinforcing layer formed in the upper and the lower side of the glass substrate adjacent to a cut cross section, performing a chemical HF treatment on a cross section of the glass substrate corresponding to the cut cross section and exposing the glass substrate by partially removing the reinforcing layer, and forming a touch screen panel per region of the unit cells, respectively.

13 Claims, 3 Drawing Sheets

TOUCH SCREEN PANEL AND METHOD FOR MANUFACTURING THEREOF

BACKGROUND

1. Field

Embodiments relate to a touch screen panel and a method for manufacturing thereof.

2. Description of the Related Art

A touch screen panel may be used as an input device that selects instructions displayed on a screen (such as an image display device, etc.) using a person's hand or an object to input instructions of a user.

A touch screen panel may be provided on a front face of an image display device to convert positions directly contacting a person's hand or an object into electrical signals. Therefore, the instructions selected at the contact position may be received as the input signals. The touch screen panel may replace a separate input device (such as a keyboard and a mouse) that is operated by being connected with the image display device. Thus, the use field of the touch screen panel is being expanded gradually.

SUMMARY

It is a feature of an embodiment to provide a touch screen panel that can be secured through mass-production.

It is another feature of an embodiment to provide a touch screen panel having a high breaking strength.

It is another feature of an embodiment to provide a method for manufacturing a touch screen panel by performing a reinforcement treatment of a glass substrate under its original condition, and a chemical HF treatment over a cross section that is not reinforced, i.e., non-reinforced side of the glass substrate exposed after cutting for forming sensing patterns on the glass substrate.

At least one of the above and other features and advantages may be realized by providing a method for manufacturing a touch screen panel, the method including reinforcing a glass substrate, the glass substrate to be formed with a plurality of touch screen panels in unit cells, reinforcing the glass substrate including forming a reinforcing layer on an upper and a lower side of the glass substrate by performing a reinforcement treatment on a whole surface of the glass substrate, cutting the reinforced glass substrate in each unit cell, removing a part of the reinforcing layer formed in the upper and the lower side of the glass substrate adjacent to a cut cross section, performing a chemical HF treatment on a cross section of the glass substrate corresponding to the cut cross section and exposing the glass substrate by partially removing the reinforcing layer, and forming a touch screen panel per region of the unit cells, respectively.

The method may further include grinding the cut cross section before or after the chemical HF treatment.

The chemical HF treatment may be implemented by using a film type of HF or dipping into an HF solution.

X sensing patterns, Y sensing patterns, a second insulating layer, a first adhesive layer, a buffer film, and a ground electrode layer may be formed in each region of each unit cell on the reinforced glass substrate for forming the touch screen panel in each unit cell.

The reinforcement treatment may be performed by heating the glass substrate at about 400° C. to about 450° C. for about 15 hrs to about 18 hrs after dipping the glass substrate into a $KNO_3$ solution.

At least one of the above and other features and advantages may also be realized by providing a touch screen panel, including sensing patterns disposed at a first side of a glass substrate, and an insulating layer disposed to cover the sensing patterns. The glass substrate may have a reinforcing layer at the first side and the second side, a part of the reinforcing layer of the first side and the second side of the glass substrate is removed, and an edge of a non-reinforced side that is exposed to a side of the glass substrate is implemented as a curved shape.

The glass substrate having the reinforcing layer may act as a window, and the first side of the glass substrate may be disposed in a direction facing a display panel.

The touch screen panel may further include an adhesive layer disposed on a side of the insulating layer, and a ground electrode layer disposed to be opposed to the insulating layer.

The reinforcing layer may be implemented by substituting a potassium (K) component for a sodium (Na) component existing on a surface of the glass substrate.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
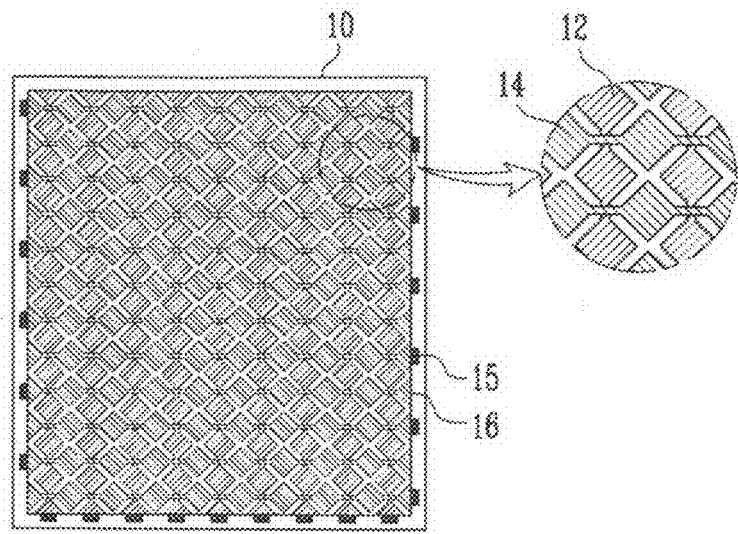
FIG. 1 illustrates a plan view in outline showing a touch screen panel according to an embodiment.

Korean Patent Application No. 10-2010-0039542, filed on Apr. 28, 2010, in the Korean Intellectual Property Office, and entitled: "Touch Screen Panel and Fabricating Method for the Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a plan view in outline showing a touch screen panel according to an embodiment. The touch screen panel as depicted in FIG. 1 may be a touch screen panel having sensing patterns formed on a glass substrate, in which a plurality of the touch screen panels are formed on the glass substrate after reinforcing the glass substrate in its original condition, and then the touch screen panels are cut as a unit cell.

Referring to FIG. 1, the touch screen panel according to an embodiment may include a plurality of sensing patterns 12, 14 disposed on the glass substrate 10 that is reinforced, metal patterns 15 that connect the sensing patterns 12, 14 to a position detecting line (not shown), and a insulating layer 16 that is formed to cover the sensing patterns 12, 14. The insulating layer 16 may be formed of a transparent insulating material that covers the sensing patterns 12, 14.

The sensing patterns 12, 14 may be alternatively disposed, and may include X sensing patterns 12 and Y sensing patterns 14 that are formed to connect to each other by one row having a same X coordinate or one column having a same Y coordinate. For example, the X sensing patterns 12 may have a plurality of X patterns that are formed to connect the sensing patterns to each other disposed in one row having same X coordinate along a first direction (row direction). Further, the Y sensing patterns 14 may have a plurality of Y patterns that are formed to connect the sensing patterns to each other disposed in one column having same Y coordinate along a second direction (column direction).

The X and Y sensing patterns 12, 14 may include a separate insulating layer therebetween, and may be formed in different layers, respectively. In this case, the X sensing patterns 12 may be patterned to be connected to each other in the first direction from patterning, and the Y sensing patterns 14 may be patterned to be connected to each other in the second direction. Thus, forming separate contact holes and connecting patterns can be omitted from the process, so that the number of masks can be reduced and the process can be simplified.

In another implementation, the X and Y sensing patterns 12, 14 may be formed in the same layer. In this case, any one of the X and Y sensing patterns 12, 14 may be formed to be connected in the first or the second direction in the patterning, and the other of the sensing patterns may be connected in the first or second direction in the forming of the contact holes and connecting patterns.

The metal patterns 15 may be disposed in an edge portion of the region having the X and Y sensing patterns 12, 14, so that the metal patterns 15 connect the X and Y sensing patterns 12, 14 to the position detecting line that is not shown. The metal patterns 15 may supply a detected signal of a contact position to a driving circuit and the like by connecting electrically the X and Y sensing patterns 12, 14 by one row or column to position detecting lines, respectively.

The touch screen panel may be a capacitance touch screen panel. A change of a capacitance according to the contact position may be transmitted from the sensing patterns 12, 14 to the driving circuit through the metal patterns 15 and the position detecting line. The contact position may be identified by converting the change of the capacitance into the electric signal by X and Y input processing circuit (not shown), and the like.

The reinforced glass substrate having the sensing patterns 12, 14, may serve together as a window. In this case, the sensing patterns 12, 14 may be disposed in a direction of a display panel, e.g., at a rear surface corresponding to the lower surface in FIG. 2. Thus, the display panel may be disposed adjacent to a bottom portion of the touch screen panel, the contact surface may be on an upper surface of the touch screen panel, and the sensing patterns 12, 14 may be formed at a bottom surface of the reinforced glass substrate 10.

The upper surface of the reinforced glass substrate 10 may be the contact surface that is contacted by a contact object, and may function as the window of the display device. In this case, the window and the glass substrate of the touch screen panel can be unified and implemented as a single unit without a separate window. For this reason, production efficiency may be improved by implementing the touch screen panel that is thinner, simplifying procedures and reducing the cost of materials. However, embodiments are not limited to using the reinforced glass substrate as a window.

In an embodiment, reinforcing the glass substrate 10 may be performed on its original substrate before cutting a unit cell, rather than for each unit cell. When cutting the unit cell of the reinforced original substrate, there is a cross section to be cut, and a non-reinforced side of the glass substrate may be exposed by the cutting operation, e.g., a lateral side or sides may be exposed. According to the present embodiment, fine cracks formed in the cross sectional portion may be removed by performing a chemical HF treatment on the cross section produced by cutting. Thus, a high breaking strength and efficient mass-production of the touch screen panel may be secured.

Figure 2:
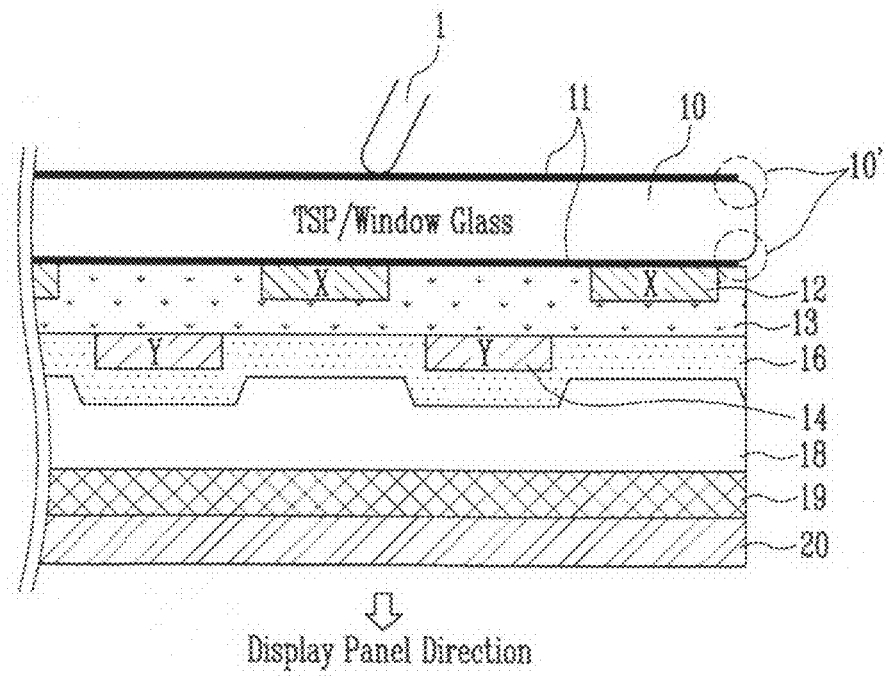
FIG. 2 illustrates a cross-sectional view showing a major part of a touch screen panel according to an embodiment.

FIG. 2 illustrates a cross-sectional view showing a major part of a touch screen panel according to an embodiment. FIG. 2 shows an embodiment where the reinforced glass substrate is used as a window, but embodiments are not limited thereto.

Referring to FIG. 2, the touch screen panel according to the present embodiment includes the sensing patterns 12, 14, the second insulating layer 16, a first adhesive layer 18, a buffer film 19, and a ground electrode layer 20 successively formed at a side of the glass substrate that is reinforced, i.e., that has a reinforced layer 11.

In this case, the side having the sensing patterns 12, 14, the second insulating layer 16, the first adhesive layer 18 and the ground electrode layer 20 may be a side in the display panel direction, i.e., a bottom side in the figures. Another side of the glass substrate 10 may be disposed in a direction contacted by the contact object 1. Thus, the glass substrate 10 may be implemented to be unified with the window, i.e., as a single component.

The sensing patterns 12, 14 may include the first insulating layer 13 made of the transparent material therebetween, and may be alternatively disposed in different layers to each other. However, embodiments are not limited thereto, and the sensing patterns 12, 14 may be disposed in the same layer.

The sensing patterns 12, 14 may be made of a transparent material such as ITO so that light emitted from the display panel disposed in the bottom portion of the touch screen panel can penetrate through the touch screen panel. The sensing patterns 12, 14 may be covered by the second insulating layer 16, which may also be made of a transparent material.

The first adhesive layer 18 may be formed between the second insulating layer 16 and the ground electrode layer 20, so that it can allow bonding therebetween. The first adhesive layer 18 may be made of the transparent material having a high light transmission. For example, the first adhesive layer 18 may be made of Super View Resin (SVR), Optically Clear Adhesive (OCA), and the like.

The ground electrode layer 20 may be made of a transparent electrode material such as ITO, may have the first adhesive layer 18 adjacent thereto, and may be formed to be opposed the second insulating layer 16. The ground electrode layer 20 may be used to secure stability between the touch screen panel and the display panel, and also may be used to form a capacitance with the sensing patterns 12, 14 according to a design of the touch screen panel. Thus, for a capacitive touch screen panel, the capacitance between the X and Y sensing patterns 12, 14 may be used in order to sense the contact position.

The buffer film 19 may be disposed between the first adhesive layer 18 and the ground electrode layer 20. Thus, the buffer film 19 may be formed in a bottom side (the side towards the display panel) of the first adhesive layer 18, and then attached to the touch screen panel. The buffer film may be disposed between the first adhesive layer 18 and the ground electrode layer 20, and may be made of a polymer material such as polyethylene terephthalate (PET) so that the buffer film 19 can improve durability of the touch screen panel and prevent scattering.

In addition, the buffer film 19 may function to increase sensitivity of the touch screen panel. More specifically, in the case of having the buffer film 19, the distance between the sensing patterns 12, 14 and the ground electrode layer 20 may increase, so that the capacitance generated therebetween may be reduced. For this reason, the touch screen panel may be more sensitive of a contact having a same level, so that the touch screen panel having a high sensitivity may be implemented.

The ground electrode layer 20 may be included on the surface of the display panel bonded with the touch screen panel, rather than within the touch screen panel.

According to the present embodiment, reinforcing the glass substrate may be performed. Reinforcing the glass substrate may be performed by heating the glass substrate at about 400° C. to about 450° C. for about 15 hrs to about 18 hrs after dipping the glass substrate into a potassium (K) solution such as a $KNO_3$ solution. The surface strength of the glass substrate may be improved by substituting a potassium (K) component for a sodium (Na) component existing on the surface of the glass substrate through the process as mentioned above. That is, strength for the reinforcing layer 11 (formed on the surface of the glass substrate by the reinforcing process) may be provided by substituting a potassium (K) component for a sodium (Na) component existing on the surface.

In a conventional method for reinforcing a glass substrate, the glass substrate is cut as a unit cell, the cut glass substrates go individually through a reinforcing process, and then the touch screen panel is attached to each reinforced glass substrate. However, in such a conventional method, there is a disadvantage in that it is difficult to secure mass-production.

In contrast, for the present embodiment, reinforcing the glass substrate 10 may be performed on its original substrate, i.e., before cutting a unit cell, not for each unit cell.

When cutting the unit cell of the reinforced original substrate, there is a cross section to be cut, and a non-reinforced side of the glass substrate may be exposed by cutting. In the present embodiment, fine cracks formed in the cross sectional portion may be removed by performing chemical HF treatment on the cross section produced by cutting, so that the breaking strength and mass-production of the touch screen panel can be secured. Thus, as depicted in FIG. 2, the lateral cross section of the glass substrate 10 according to the present embodiment may be implemented as edges 10' having a gentle shape, e.g., a curved or rounded shape, by the chemical HF treatment.

FIGS. 3A to FIG. 3E illustrate cross-sectional views of stages in a method for manufacturing a touch screen panel according to an embodiment.

Figure 3A:
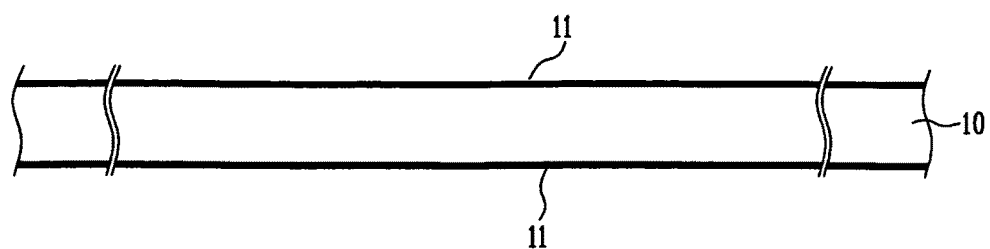
FIGS. 3A to FIG. 3E illustrate cross-sectional views of stages in a method for manufacturing a touch screen panel according to an embodiment.

First, referring to FIG. 3A, the reinforcement process may be performed over the whole surface of the glass substrate 10 that is to be formed with the plurality of the touch screen panel in the unit cell. The reinforcement process may be performed by heating the glass substrate at about 400° C. to about 450° C. for about 15 hrs to about 18 hrs after dipping the glass substrate into a $KNO_3$ solution. The surface strength of the glass substrate may be improved by substituting a potassium (K) component for a sodium (Na) component existing on the surface of the glass substrate through the process as mentioned above. However, the reinforcement process of the glass substrate is not limited thereto. The reinforcing layer 11 may be on the surface of the glass substrate after performing the reinforcement process.

Figure 3B:
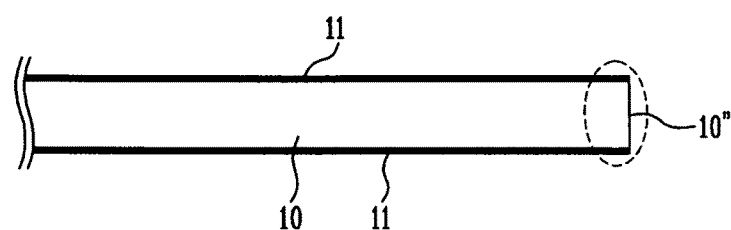

Next, as depicted in FIG. 3B, the original glass substrate that is reinforced may be cut in the region of each unit cell. Note, however, that FIG. 3B shows only the cut region of a unit cell. Cutting may be implemented by using a physical or chemical operation, such as wheel, laser, water jet, etching, and the like.

Upon performing cutting, the non-reinforced side 10" may be exposed in the cut cross section, as depicted in the drawing. Cutting may result in the non-reinforced side 10" having a fine crack, which may cause a reliability decrease. Thus, the chemical HF treatment may be performed on the non-reinforced side 10" according to the present embodiment, so that the reliability of product can be secured. The fine crack in the cut cross section part may be removed or relieved through the chemical HF treatment, so that the strength can be increased.

Figure 3C:
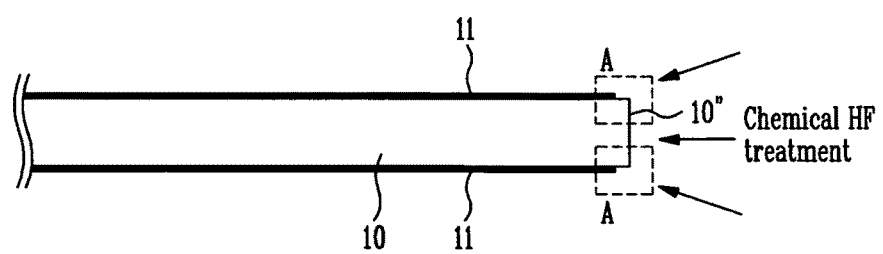

Referring to FIG. 3C, a part of the reinforcing layer formed in an upper and lower side of the glass substrate adjacent to the cut cross section A may be removed after cutting the glass substrate 10 having the reinforcing layer 11.

Next, as depicted in FIG. 3C, the chemical HF treatment may be performed on the part of the glass substrate corresponding to the cut cross section and exposed part by removing the reinforcing layer 11. The chemical HF treatment may be implemented by using, e.g., a film type of HF or dipping by HF solution. A sharp inside part of the fine crack generated on the cut cross section through the chemical HF treatment may be recessed, or the outside part of the cut cross section having the fine crack may be removed.

Figure 3D:
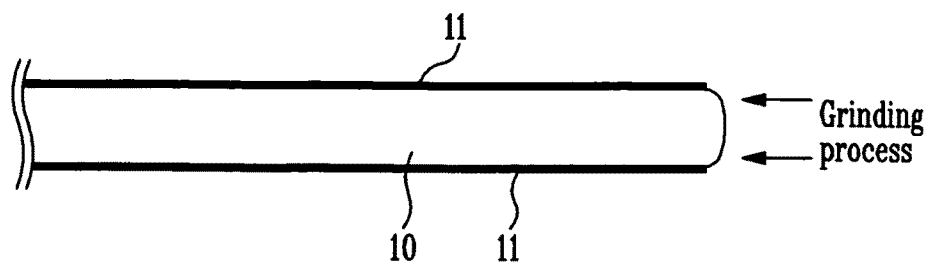

In addition, as depicted in FIG. 3D, grinding the cross section may be further performed after the chemical HF treatment, so that the fine crack can be removed more completely. In another implementation, grinding the cross section may be performed before the chemical HF treatment.

Figure 3E:
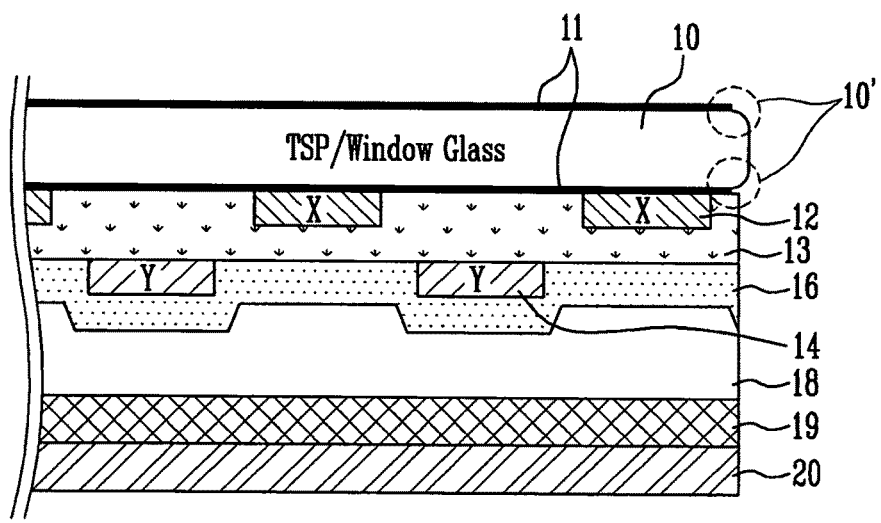

If the treatment of the cut cross section is completed as mentioned above, the edges 10' of the cut cross section may be implemented as the gentle shape as depicted in FIG. 3E.

If the treatment of the cut cross section of the reinforced glass substrate cut in the unit cell is completed as mentioned above, the sensing electrode, and the like of the touch screen panel may be formed in the unit cell, respectively. For example, as depicted in FIG. 3E, the X sensing patterns 12, the first insulating layer 13, the Y sensing patterns 14, the second insulating layer 16, the first adhesive layer 18, the buffer film 19, and the ground electrode layer 20 may be successively formed in every region of each unit cell on the original substrate that is reinforced.

In an implementation, the sensing patterns 12 may be formed by patterning after forming a layer made of the transparent electrode material, such as ITO, in every region of the unit cells. In this case, even though a connecting unit of the X sensing patterns 12 is not shown, the X sensing patterns 12 may be pattered to be connected along the first direction (for example, the row direction) per the region of each unit cell.

Then, the first insulating layer 13 may be formed by printing and sintering a first insulating material by using a printing process, which may be easily performed on the X sensing patterns 12. However, forming the first insulating layer 13 is not limited to using the printing process. For example, the first insulating layer 13 may be formed by using CVD, sputtering, and the like.

Then, the Y sensing patterns 14 may be formed by patterning after forming a layer made of the transparent electrode material, such as ITO, on the first insulating layer 13. In this case, the Y sensing patterns 14 may be disposed to not overlap with the X sensing patterns 12 (however, the connecting unit of the Y sensing patterns 14 may be excepted). Further, the Y sensing patterns 14 may be patterned to be connected along the second direction (for example, the column direction) (not shown in the drawings). Meanwhile, after forming the Y sensing patterns 14, the metal patterns 15 as depicted in FIG. 1, the position detecting line (not shown), and the like may be further formed by using a low-resistance material having a lower surface resistance than the transparent electrode material, such as triple layer of Mo/Al/Mo, or a chrome layer, and the like.

Then, the second insulating layer 16 may be formed by printing and sintering the second insulating material by using the printing process on the Y sensing patterns 14 and the metal patterns 15. However, a method for forming the second insulating layer 16 is not limited to the printing process, and the second insulating layer 16 may be formed by using CVD, sputtering, and the like.

Then, the first adhesive layer 18, the buffer film 19, and the ground electrode layer 20 may be successively formed on the second insulating layer 16. In this case, the first adhesive layer 18 may be formed of a transparent adhesive material having a high light transmittance, such as Super View Resin (SVR), Optically Clear Adhesive (OCA), and the like.

In addition, the ground electrode layer 20 may be made of the transparent electrode material, such as ITO. The ground electrode layer 20 may be used to secure stability between the touch screen panel and the display panel, and also form the capacitance with the sensing patterns 12, 14 according to the design method of the touch screen panel. Thus, the capacitance between the X and Y sensing patterns 12, 14, and the ground electrode layer 20 may be used to sense the contact position in a capacitive touch screen panel.

In addition, the buffer film 19 formed between the first adhesive layer 18 and the ground electrode layer 20 may be made of the polymer material, such as polyethylene terephthalate (PET), and the like, so that the buffer film 19 can improve durability of the touch screen panel and prevent breakage or scattering. In addition, the buffer film 19 may function to increase sensitivity of the touch screen panel.

Generally, a touch screen panel has a sensing cell and the like formed on a glass substrate. In this case, the glass substrate may be implemented as a reinforced glass substrate in order to secure strength. However, in order to use the reinforced glass substrate, the conventional approach is that the glass substrate is cut as a unit cell, and then the cut glass substrates individually goes through a reinforcing process. However if the touch screen panel is manufactured by using the glass substrate of a unit cell, there is a disadvantage that it is difficult to secure mass-production. On the other hand, if the touch screen panel is manufactured in its original condition, i.e., by using a glass substrate that is not reinforced, there may be problems in reliability because the breaking strength is low, i.e., weak.

In contrast, as described above, embodiments provide a method for manufacturing a touch screen panel that includes forming a reinforcing layer on an upper and lower side of a glass substrate by performing a reinforcement treatment on a whole surface of the glass substrate to be formed with a plurality of the touch screen panel in a unit cell; cutting the reinforced glass substrate in each unit cell; removing a part of the reinforcing layer formed in the upper and the bottom side of the glass substrate adjacent to the cut cross section; performing a chemical HF treatment on the cross section of the glass substrate corresponding to the cut cross section and the exposed glass substrate by removing the reinforcing layer; and forming the touch screen panel per the region of the unit cell, respectively.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A touch screen panel, comprising:
sensing patterns disposed at a first side of a glass substrate; and
an insulating layer disposed to cover the sensing patterns,
wherein the glass substrate has a reinforcing layer at the first side and at a second side, a part of the reinforcing layer of the first side and the second side of the glass substrate is removed, and an edge of a non-reinforced side that is exposed to a side of the glass substrate is implemented as a curved shape.

2. The touch screen panel as claimed in claim 1, wherein the glass substrate having the reinforcing layer acts as a window, and the first side of the glass substrate is disposed in a direction facing a display panel.

3. The touch screen panel as claimed in claim 1, further comprising an adhesive layer disposed on a side of the insulating layer, and a ground electrode layer disposed to be opposed to the insulating layer.

4. The touch screen panel as claimed in claim 1, wherein the reinforcing layer is implemented by substituting a potassium (K) component for a sodium (Na) component existing on a surface of the glass substrate.

5. The touch screen panel as claimed in claim 4, wherein the reinforcing layer having the potassium (K) component is removed at the edge having the curved shape.

6. A touch screen panel, comprising:
a glass substrate wherein the glass substrate comprises:
a reinforcing layer on a first side and a second side of the glass substrate; and
a non-reinforced curved edge at an end of the first and second sides by exposing the reinforcing layer;
sensing patterns disposed at the first side of the glass substrate;
an insulating layer disposed to cover the sensing patterns;
an adhesive layer disposed on a side of the insulating layer; and
a ground electrode layer disposed opposing the insulating layer.

7. The touch screen panel as claimed in claim 6, wherein the ground electrode layer comprises indium tin oxide.

8. The touch screen panel as claimed in claim 6, wherein the sensing patterns comprise an X sensing pattern and a Y sensing pattern.

9. The touch screen panel as claimed in claim 8, wherein the insulating layer is a second insulating layer disposed to cover the Y sensing pattern and the touch screen panel further comprises a first insulating layer disposed to cover the X sensing pattern.

10. The touch screen panel as claimed in claim 6, further comprising a display panel on the ground electrode layer.

11. The touch screen panel as claimed in claim 10, wherein the side of the insulating layer is towards the first side of the glass substrate.

12. The touch screen panel as claimed in claim 11, further comprising a buffer film between the adhesive layer and the ground electrode layer.

13. The touch screen panel as claimed in claim 12, wherein the buffer film comprises polyethylene terephthalate.

* * * * *